US012801938B2

(12) United States Patent
Henson et al.

(10) Patent No.: US 12,801,938 B2
(45) Date of Patent: Nov. 17, 2026

(54) SYSTEM AND METHOD FOR KNOWLEDGE-BASED ENTITY PREDICTION

(71) Applicant: Robert Bosch GmbH, Stuttgart (DE)

(72) Inventors: Cory Henson, Pittsburgh, PA (US); Ruwan Tharanga Wickramarachchige Don, Columbia, SC (US)

(73) Assignee: Robert Bosch GmbH, Stuttgart (DE)

( * ) Notice: Subject to any disclaimer, the term of this patent is extended or adjusted under 35 U.S.C. 154(b) by 1359 days.

(21) Appl. No.: 17/508,227

(22) Filed: Oct. 22, 2021

(65) Prior Publication Data

US 2023/0127121 A1 Apr. 27, 2023

(51) Int. Cl.
*G06N 5/02* (2023.01)
*G06F 16/903* (2019.01)
*G06N 20/00* (2019.01)

(52) U.S. Cl.
CPC ......... *G06N 5/02* (2013.01); *G06F 16/90335* (2019.01); *G06N 20/00* (2019.01)

(58) Field of Classification Search
CPC .... G06N 5/02; G06N 20/00; G06F 16/90335; G06V 10/20; G06V 10/40; G06V 10/70; G06V 20/62; G06V 2201/08; G06T 7/12; G06T 2207/20084; G06T 2207/20081; G06T 7/33; G06T 7/246; G06T 7/73; G06T 2207/10016; G06T 2207/30168
See application file for complete search history.

(56) References Cited

U.S. PATENT DOCUMENTS

2020/0242444 A1* 7/2020 Zhang .................... G06N 3/042

FOREIGN PATENT DOCUMENTS

| | | |
|---|---|---|
| CN | 112835992 | 5/2021 |
| CN | 113239178 | 8/2021 |

OTHER PUBLICATIONS

Wickramarachchi, Ruwan, Cory Henson, and Amit Sheth. "An evaluation of knowledge graph embeddings for autonomous driving data: Experience and practice." arXiv preprint arXiv:2003.00344 (2020). (Year: 2020).*

(Continued)

*Primary Examiner* — Daniel T Pellett
(74) *Attorney, Agent, or Firm* — Kathy Takeguchi; Maginot, Moore & Beck LLP

(57) ABSTRACT

A computer-implemented system and method provide knowledge-based entity prediction. A knowledge graph includes nodes and edges. A set of the nodes represent labels associated with a scene. The edges represent relations between related pairs of nodes. A path is identified with multiple edges having multiple relations from a source node to a target node via at least one intermediary node. The path is reified by generating a reified relation as a new edge to represent the multiple relations of the path. The reified relation directly connects the source node to the target node. A reified knowledge graph structure is constructed based on the knowledge graph and the reified relation. The reified knowledge graph structure includes at least the source node, the target node, and the new edge. A machine learning system is trained to learn a latent space defined by the reified knowledge graph structure to provide knowledge-based entity prediction.

19 Claims, 6 Drawing Sheets

(56) References Cited

OTHER PUBLICATIONS

Enterprise Knowledge, "RDF*: What is it and Why do I Need it?", self published, Jul. 24, 2020 (retrieved from <<https://enterprise-knowledge.com/rdf-what-is-it-and-why-do-i-need-it/>> on Jun. 25, 2025 "Enterprise") (Year: 2020).*
Hartig, Olaf, et al., "Foundations of an Alternative Approach to Reification in RDF", arxiv.org, Jun. 13, 2014 (rev. Dec. 16, 2021, accessed from <<https://arxiv.org/abs/1406.3399>> on Jun. 25, 2025) (Year: 2014).*
Seo, Seungmin et al., "Reliable Knowledge Graph Path Representation Learning", Yonsei University, Seoul, South Korea, Feb. 25, 2020 (accessed from <<https://ieeexplore.ieee.org/stamp/stamp.jsp?tp=&arnumber=8999619> on Jun. 25, 2025) (Year: 2020).*
Dahchour, Mohamed, and Alain Pirotte. "The Semantics of Reifying n-ary Relationships as Classes." ICEIS. vol. 2. 2002. (Year: 2002).*
Henson et al., "Knowledge Infused Learning for Autonomous Driving," K-iLKJC21, Bosch Research, May 3, 2021, pp. 1-16.
Seo et al., "Reliable Knowledge Graph Path Representation Learning," IEEE Access, vol. 8, Feb. 14, 2020, pp. 32816-32825.
Agrawal et al., "Fast Discovery of Association Rules," Advances in Knowledge Discovery and Data Mining, eds. U.M. Fayyad, G. Piatetsky-Shapiro, P. Smyth, and R. Uthurusamy (AAAI/MIT Press), 1996, pp. 307-328.
Bordes et al., "Translating Embeddings for Modeling Multi-relational Data," Adv. in Neural Information Processing Systems, 2013, pp. 2787-2795.
Caesar et al., "nuScenes: A multimodal dataset for autonomous driving," arXiv:1903.11027v5 [cs.LG] May 5, 2020, pp. 1-16.
Celebi et al., "Evaluation of knowledge graph embedding approaches for drug-drug interaction prediction in realistic settings," BMC Bioinformatics, 2019, 20:726, pp. 1-15.
Chen et al., "Multilingual Knowledge Graph Embeddings for Cross-lingual Knowledge Alignment," Proceedings of the Twenty-Sixth International Joint Conference on Artificial Intelligence (IJCAI-17), 2017, pp. 1511-1517.
Chen et al., "Knowledge Graph Completion: A Review," Digital Ojbect Identifier,10.1109/ACCESS 2020.303076, vol. 8, Oct. 2020, pp. 192435-192456.
AmpliGraph: a Library for Representation Learning on Knowledge Graphs, 2021, doi:10.5281/zenodo.2595043 https://docs.ampligraph.org/en/1.4.0/index.html.
Ding et al., "Improving Knowledge Graph Embedding Using Simple Constraints," Proceedings of the 56th Annual Meeting of the Association for Computational Linguistics (Long Papers), Melbourne, Australia, Jul. 15-20, 2018, pp. 110-121.
Galarraga et al. "Fast rule mining in ontological knowledge bases with AMIE+," The VLDB Journal, 2015, 24: pp. 707-730.
Garcez et al., "Neurosymbolic AI: The 3rd Wave," arXiv:2012.05876v2 [cs.AI] Dec. 16, 2020, pp. 1-37.
Gaur et al., "Semantics of the Black-Box: Can Knowledge graphs help make deep learning systems ore interpretable and explainable? ," arXiv:2010.08660v4 [cs.AI] Dec. 11, 2020, pp. 1-7.
Geiger et al., "Vision meets robotics: The KITTI dataset," The International Journal of Robotics Research, 32(11) pp. 1231-1237.
Grigorescu et al., "A Survey of Deep Learning Techniques for Autonomous Driving," arXiv:1910.07738v2 [cs.LG] Mar. 24, 2020, pp. 1-28.
Halilaj et al., "A Knowledge Graph-based Approach for Situation Comprehension in Driving Scenarios," European Semantic Web Conference (ESWC), May 31, 2021, pp. 1-16.
Henson et al., "Using a Knowledge Graph of Scenes to Enable Search of Autonomous Driving Data," Proceedings of the 2019 International Semantic Web Conference (ISWC 2019), 2019, pp. 1-2.
Jain et al., "Do Embeddings Actually Capture Knowledge Graph Semantics?," The Semantic Web: 18th International Conference, ESWC 2021, Virtual Event, Jun. 6-10, 2021, pp. 1-16.
Jia et al., "Improving Knowledge Graph Embedding Using Locally and Globally Attentive Relation Paths," Springer Nature Switzerland AG, ECIR, 2020, LNCS 12035, pp. 17-32.
Kazemi et al., "SimplE Embedding for Link Prediction in Knowledge Graphs," Adv. in Neural Information Processing Systems (NIPS), 2018, vol. 31, pp. 1-12.
Kingma, et al., "ADAM: A Method for Stochastic Optimization," arXiv:1412.6980v9 [cs.LG] Jan. 30, 2017, pp. 1-15.
Lao et al., "Relational Retrieval Using a Combination of Path-Constrained Random Walks," Machine Learning, Jul. 2010, vol. 81, pp. 1-16.
Lao et al., "Random Walk Inference and Learning in a Large Scale Knowledge Base," EMNLP '11: Proceedings of the Conference on Empirical Methods in Natural Language Processing, Jul. 2011, 11 pages.
Resource description framework (rdf) model and syntax specification, 1998, https://www.w3.org/TR/1999/REC-rdf-syntax-19990222/.
Lin et al., "Learning Entity and Relation Embeddings for Knowledge Graph Completion," Proceedings of the Twenty-Ninth AAAI Conference on Artificial Intelligence, 2015, pp. 2181-2187.
Ma et al., "Towards Generalizable Neuro-Symbolic Systems for Commonsense Question Answering," Proceedings of the First Workshop on Commonsense Inference in Natural Language Processing, HongKong, Nov. 3, 2019, pp. 22-32.
Mao et al., "The Neuro-Symbolic Concept Learner: Interpreting Scenes, Words, and Sentences from Natural Supervision," ICLR 2019, pp. 1-28.
"OWL 2 Web Ontology Language Document Overview (Second Edition)," W3C Recommendation, Dec. 11, 2012, pp. 1-7.
Meilicke et al., "Fine-grained Evaluation of Rule- and Embedding-based Systems for Knowledge Graph Completion," The Semantic Web, ISWC 2018: 17th International Semantic Web Conference, CA, USA, Oct. 2018, 16 pages.
Mohamed et al., "Discovering protein drug targets using knowledge graph embeddings," Bioinformatics, 36(2), 2020, pp. 603-610.
Nguyen et al., "A Novel Embedding Model for Knowledge Base Completion Based on Convolutional Neural Network," Proceedings of NAACL-HLT 2018, pp. 327-333.
Nickel et al., "Holographic Embeddings of Knowledge Graphs," Proceedings of the Thirtieth AAAI Conference on Artificial Intelligence (AAAI-16), 2016, pp. 1955-1961.
Palmonari et al., "Knowledge Graph Embeddings and Explainable AI," arXiv:2004.14843v1 [cs.AI] Apr. 30, 2020, pp. 1-24.
Perry et al., "Open Geospatial Consortium," OGC 11-052r3, Jul. 2, 2011, 71 pages.
Ramanishka et al., "Toward Driving Scene Understanding: A Dataset for Learning Driver Behavior and Causal Reasoning," The IEEE Conference on Computer Vision and Pattern Recognition (CVPR), 2018, pp. 7699-7707.
Rossi et al., "Knowledge Graph Embedding for Link Prediction: A Comparative Analysis," ACM Transactions on Knowledge Discovery from Data, vol. 15, No. 2, Article 14, Dec. 2020, 49 pages.
PandaSet. Scale AI. 2020. https://scale.com/open-datasets/pandaset.
Sheth et al., "Shades of Knowledge-Infused Learning for Enhancing Deep Learning," IEEE Computer Society, 2019, 10 pages.
Suchan et al., "Driven by Commonsense," 24th European Conference on Artificial Intelligence—ECAI 2020, Santiogo de Compostela, Spain, pp. 1-2.
Tiddi et al., "Knowledge Graphs for Explainable Artificial Intelligence: Foundations, Applications and Challenges," vol. 47 (IOS Press), 2020, 6 pages.
Toutanova et al., "Observed versus latent features for knowledge base and text inference," Proceedings of the 3rd Workshop on Continuous Vector Space Models and their Compositional (CVSC), Jul. 2015, pp. 57-66.
Valiant, "Knowledge Infusion," Division of Engineering and Applied Sciences, Harvard University, American Association for Artifical Intelligence, 2006, 6 pages.
Wang et al. Knowledge Graph Embedding: A survey of Approaches and Applications. IEEE Trans. on Knowledge and Data Engineering. vol. 29, No. 12, Dec. 2017, 20 pages.

(56) References Cited

OTHER PUBLICATIONS

Wickramarachchi et al., "An Evaluation of Knowledge Graph Embeddings for Autonomous Driving Data: Experience and Practice." AAAI-MAKE 2020, 11 pages.
Xu et al., "A Survey of Scene Graph: Generation and Application," IEEE Transactions on Neural Networks and Learning Systems, 2020, 20 pages.
Yurtsever et al., "A Survey of Autonomous Driving: Common Practices and Emerging Technologies," IEEE Access, vol. 8, 2020, pp. 58443-58469.
Zhang et al., "A Review on Multi-Label Learning Algorithms," IEEE Transactions on Knowledge and Data Engineering, vol. 26, No. 8, Aug. 2014, pp. 1819-1837.

* cited by examiner

SYSTEM AND METHOD FOR KNOWLEDGE-BASED ENTITY PREDICTION

This disclosure relates generally to neuro-symbolic computing, or knowledge-infused learning, for entity prediction.

BACKGROUND

In general, the field of autonomous driving typically involves processing a multitude of data streams from an array of sensors. These data streams are then used to detect, recognize, and track objects in a scene. For example, in computer vision, a scene is often represented as a set of labeled bounding boxes, which are provided around the objects that are detected within a frame. However, scenes are often more complex than just a set of recognized objects. While machine learning techniques have been able to perform these object recognition tasks, they tend to lack the ability to fully utilize the interdependence of entities and semantic relations within a scene. These machine learning techniques, when taken alone, are not configured to provide high-level scene understanding, which is accurate and complete.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer implemented method for knowledge-based entity prediction is disclosed. The method includes obtaining a knowledge graph based on (i) labels associated with a scene and (ii) an ontology. The knowledge graph includes nodes and edges. A set of the nodes represent the labels associated with the scene. Each edge represents a relation between related pairs of nodes. The method includes identifying a path with multiple edges having multiple relations from a source node to a target node via at least one intermediary node between the source node and the target node. The method includes reifying the path by generating a reified relation to represent the multiple relations of the path in which the reified relation is represented as a new edge that directly connects the source node to the target node. The method includes generating a reified knowledge graph structure based on the knowledge graph. The reified knowledge graph structure includes at least the source node, the target node, and the new edge. The method includes training a machine learning system to learn a latent space defined by the reified knowledge graph structure.

According to at least one aspect, a data processing system comprises one or more non-transitory computer readable storage media and one or more processors. The one or more non-transitory computer readable storage media store computer readable data including instructions that are executable to perform a method. The one or more processors are in data communication with the one or more non-transitory computer readable storage media. The one or more processors are configured to execute the computer readable data and perform the method. The method includes obtaining a knowledge graph based on (i) labels associated with a scene and (ii) an ontology. The knowledge graph includes nodes and edges. A set of the nodes represent the labels associated with the scene. Each edge represents a relation between related pairs of nodes. The method includes identifying a path with multiple edges having multiple relations from a source node to a target node via at least one intermediary node between the source node and the target node. The method includes reifying the path by generating a reified relation to represent the multiple relations of the path in which the reified relation is represented as a new edge that directly connects the source node to the target node. The method includes generating a reified knowledge graph structure based on the knowledge graph. The reified knowledge graph structure includes at least the source node, the target node, and the new edge. The method includes training a machine learning system to learn a latent space defined by the reified knowledge graph structure.

According to at least one aspect, a computer-implemented method includes obtaining a knowledge graph with data structures that include at least a first triple and a second triple. The first triple includes a first scene instance, a first relation, and a first entity instance. The first relation relates the first scene instance to the first entity instance. The second triple includes the first entity instance, a second relation, and a first class. The second relation relates the first entity instance to the first class. The method includes identifying a path based on the first triple and the second triple. The path is defined from the first scene to the first class with the first entity instance being between the first scene instance and the first class. The path includes at least the first relation and the second relation. The method includes reifying the path by generating a reified relation to represent the first relation and the second relation such that the reified relation directly relates the first scene to the first class. The method includes constructing a reified knowledge graph structure with a reified triple. The reified triple includes the first scene, the reified relation, and the first class. The method includes training a machine learning system to learn a latent space of the reified knowledge graph structure.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
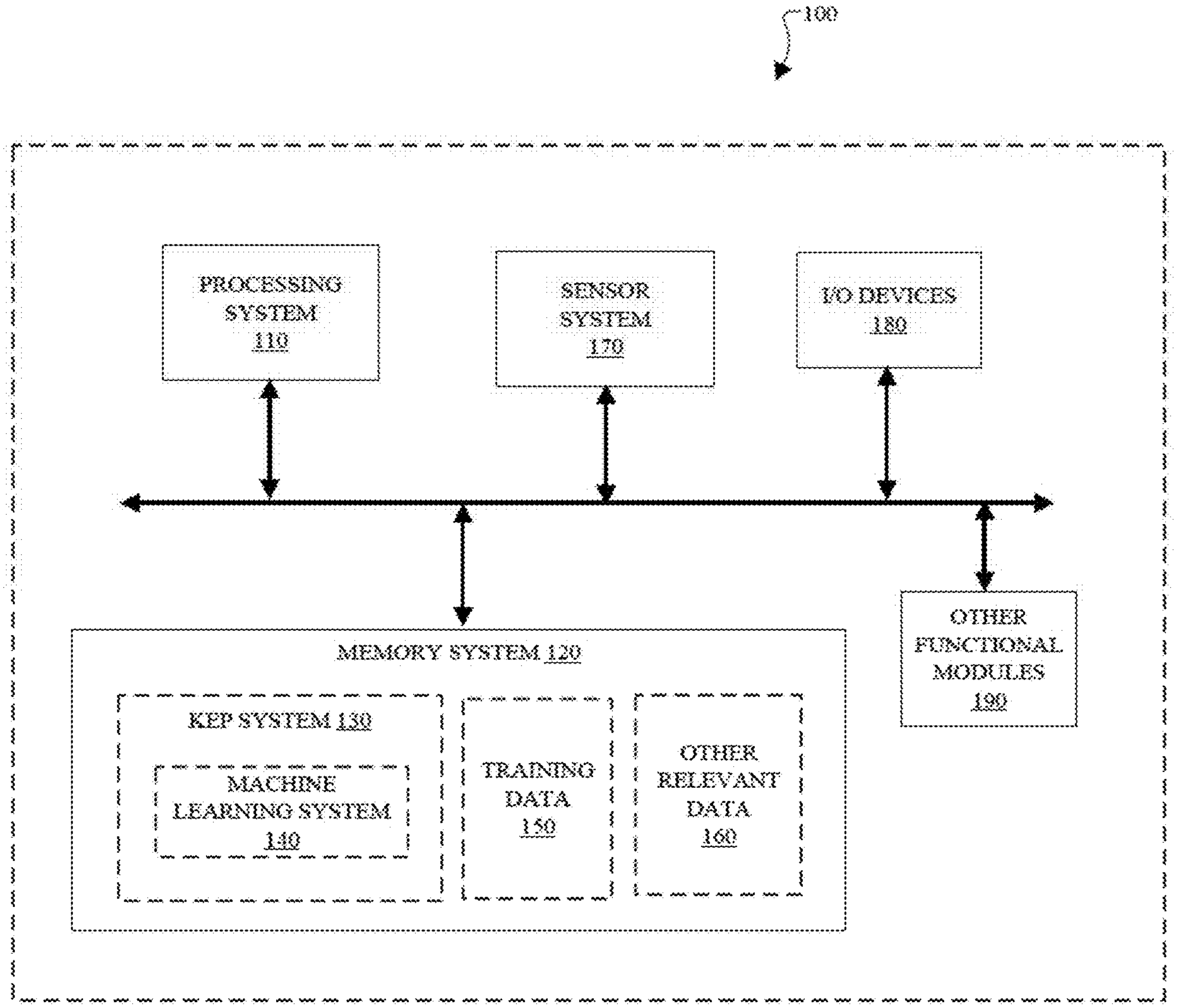
FIG. 1 is a diagram of a non-limiting example of a system relating to knowledge-based entity prediction according to an example embodiment of this disclosure.

FIG. 1 is a diagram of a non-limiting example of a system 100 configured to perform knowledge-based entity prediction (KEP) according to an example embodiment of this disclosure. KEP includes the task of predicting the inclusion of one or more potentially unrecognized or missing entities in a scene, given the current and background knowledge of the scene that are represented as a knowledge graph (KG). The system 100 includes at least a processing system 110 with at least one processing device. For example, the processing system 110 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to provide the functionality as described herein.

The system 100 includes a memory system 120, which is operatively connected to the processing system 110. In an example embodiment, the memory system 120 includes at least one non-transitory computer readable storage medium, which is configured to store and provide access to various data to enable at least the processing system 110 to perform the operations and functionality, as disclosed herein. In an example embodiment, the memory system 120 comprises a single memory device or a plurality of memory devices. The memory system 120 can include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and combination thereof. With respect to the processing system 110 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 110 and/or other components of the system 100.

The memory system 120 includes at least a KEP system 130, a machine learning system 140, training data 150, and other relevant data 160, which are stored thereon. The KEP system 130 includes computer readable data with instructions, which, when executed by the processing system 110, is configured to provide KEP. The computer readable data can include instructions, code, routines, various related data, any software technology, or any number and combination thereof. In addition, the machine learning system 140 includes a knowledge graph embedding (KGE) model, a KGE algorithm, any suitable artificial neural network model, or any number and combination thereof. Also, the training data 150 includes a sufficient amount of sensor data, label data, KG data, KG structure data, various loss data, various weight data, and various parameter data, as well as any related machine learning data that enables the system 100 to provide the KEP, as described herein. Meanwhile, the other relevant data 160 provides various data (e.g. operating system, etc.), which enables the system 100 to perform the functions as discussed herein.

The system 100 is configured to include at least one sensor system 170. The sensor system 170 includes one or more sensors. For example, the sensor system 170 includes an image sensor, a camera, a radar sensor, a light detection and ranging (LIDAR) sensor, a thermal sensor, an ultrasonic sensor, an infrared sensor, a motion sensor, an audio sensor, an inertial measurement unit (IMU), any suitable sensor, or any number and combination thereof. The sensor system 170 is operable to communicate with one or more other components (e.g., processing system 110 and memory system 120) of the system 100. More specifically, for example, the processing system 110 is configured to obtain the sensor data directly or indirectly from one or more sensors of the sensor system 170. The sensor system 170 is local, remote, or a combination thereof (e.g., partly local and partly remote). Upon receiving the sensor data, the processing system 110 is configured to process this sensor data in connection with the KEP system 130, the machine learning system 140, the training data 150, or any number and combination thereof.

In addition, the system 100 may include at least one other component. For example, as shown in FIG. 1, the memory system 120 is also configured to store other relevant data 160, which relates to operation of the system 100 in relation to one or more components (e.g., sensor system 170, I/O devices 180, and other functional modules 190). In addition, the system 100 is configured to include one or more I/O devices 180 (e.g., display device, keyboard device, speaker device, etc.), which relate to the system 100. Also, the system 100 includes other functional modules 190, such as any appropriate hardware, software, or combination thereof that assist with or contribute to the functioning of the system 100. For example, the other functional modules 190 include communication technology that enables components of the system 100 to communicate with each other as described herein. In this regard, the system 100 is operable to at least train, employ, or both train and employ the machine learning system 140 (and/or the KEP system 130) to perform KEP.

Figure 2:
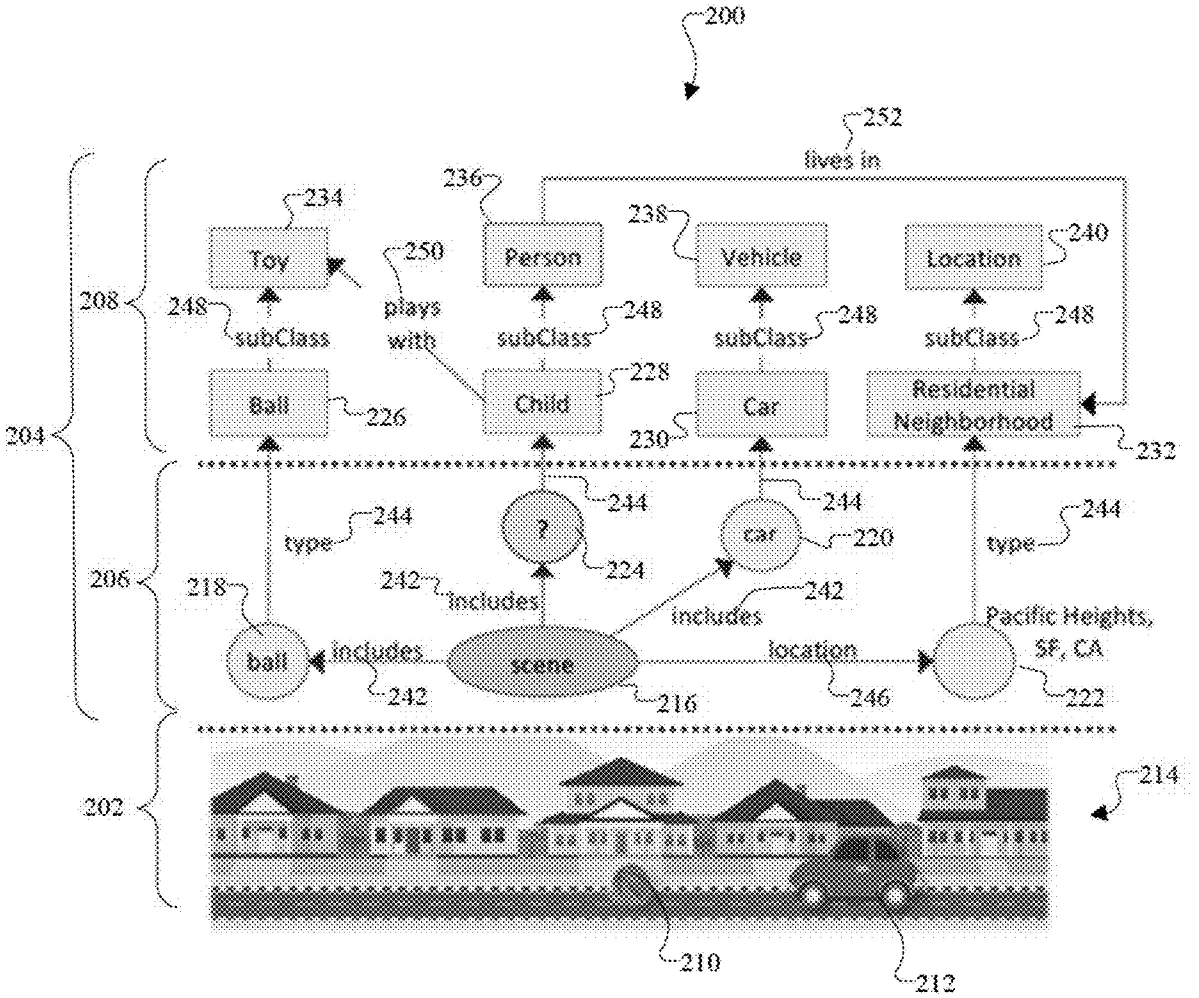
FIG. 2 is a diagram of a non-limiting example of a scene along with a corresponding knowledge graph according to an example embodiment of this disclosure.

FIG. 2 is a conceptual diagram 200 that illustrates various aspects relating to a non-limiting example of a KEP task according to an example embodiment. In this regard, FIG. 2 illustrates a non-limiting example of a scene 202 along with a corresponding KG 204. In FIG. 2, the scene 202 is taken by an ego vehicle (not shown), which is configured to have a certain level of autonomy, while driving through a residential neighborhood 214 on a Saturday afternoon. In this example, the ego vehicle includes a perception module, which detects and recognizes a ball 210 bouncing on the road, as well as another sedan 212. In this case, based on this scene 202 and the detection of the ball 210, there may be an inquiry as to "What is the probability that a child is nearby, perhaps chasing after the ball?" The answer to this inquiry involves a prediction task, which requires knowledge of the scene 202 that may be outside the scope of traditional computer vision techniques. For example, this prediction task requires an understanding of the semantic relations between various aspects of the scene 202, e.g. that a ball is a preferred toy of children, that children often live and play in residential neighborhoods, that children tend to play outside on Saturday afternoons, etc. In contrast to traditional computer vision techniques, the KEP system 130 is configured to leverage a knowledge-based approach to provide an answer to that question and also predict the unrecognized/missing entity in that scene for this KEP task.

In addition, FIG. 2 shows that the scene 202 may be represented by a knowledge base, which includes an assertion component ("ABox") 206 and a terminological component ("TBox") 208. The ABox 206 includes specific instances, which are denoted as round nodes in FIG. 2. More specifically, in FIG. 2, the Abox 206 includes at least a "scene" node 216, a "ball" node 218, a "car" node 220, and a "Pacific Heights, SF, CA" node 222, which refer to specific instances within the scene 202. The "ball" node 218 refers to the detection of the basketball within the scene 202. The "car" node 220 refers to the detection of the sedan 212 within the scene. The "Pacific Heights, SF, CA" node 222 refers to the detection of the location of the scene 202. The ABox 206 further includes a "?" node 224 to represent a possible missing or unrecognized entity instance within the scene 202.

The TBox 208 describes a domain of interest by defining classes and properties as a domain vocabulary. Meanwhile, the Abox 206 includes assertions, which use the vocabulary defined by the TBox 208. For example, in FIG. 2, the TBox 208 includes entity classes, which are denoted as rectangular nodes. More specifically, the TBox 208 includes at least a "Ball" node 226, a "Child" node 228, a "Car" node 230, and a "Residential Neighborhood" node 232, which refer to the entity classes of the corresponding specific instances within the Abox 206. In addition, the TBox 208 also includes at least a "Toy" node 234, a "Person" node 236, a "Vehicle" node 238, and a "Location" node 240, which refer to the entity classes of the corresponding specific entity instances. As shown in FIG. 2, each of the nodes in the KG 204 is connected to at least one other related node via a relation (e.g., "includes" relation 242, "type" relation 244, "location" relation 246, "subclass" relation 248, "playswith" relation 250, and "livesin" relation 252), which indicates a relationship between these two related nodes. For example, in FIG. 2, the "Car" node 230 is an entity class, which is related to the "Vehicle" node 238, which happens to be another entity class, thereby indicating that the entity class of "Car" is a subclass of the entity class of "Vehicle."

FIG. 2 further illustrates a number of relationships between related nodes of the KG 204. For example, the KG 204 includes the "scene" node 216, which refers to the actual driving scene 202, and the "ball" node 218, which refers to a detection of the actual ball 210 (e.g., basketball) in the driving scene 202 in the real world. The "scene" node 216 and the "ball" node 218 are connected via the "includes" relation to indicate that the scene 202 includes the ball 210. The "ball" node 218 is related to the "Ball" node 226 via the "type" relation 244 to indicate that "ball" is a specific instance of a type associated with the class of "Ball." Resource Description Framework Schema (RDFS), Web Ontology Language (OWL), or any suitable language may be used as a modeling language in the KG 204. As shown in FIG. 2, the structure of this KG 204 is advantageous in providing predictions at the entity class level (i.e., TBox level) such that the output with respect to the missing/unrecognized entity refers to an entity class (e.g., "Child") instead of the specific instance of that entity (e.g., Bob) for a downstream application, which in this case relates to autonomous driving.

Also, in FIG. 2, the KG 204 includes a "?" node 224 to represent a potential entity instance, which is unrecognized or missing in the given scene 202. The entity instance may be missing or unrecognized for various reasons, such as hardware limitations, occluded entities, poor field-of view, degraded visuals, device failure, etc. Given the current and background knowledge of the scene 202, the task of predicting this unrecognized or missing entity (e.g., a child), as indicated by the "?" node 224, tends to be outside the scope of traditional computer vision techniques. In contrast, the KEP system 130 is configured to provide an answer for this KEP task via a knowledge-infused learning approach, which integrates or infuses knowledge into one or more machine learning models.

Figure 3:
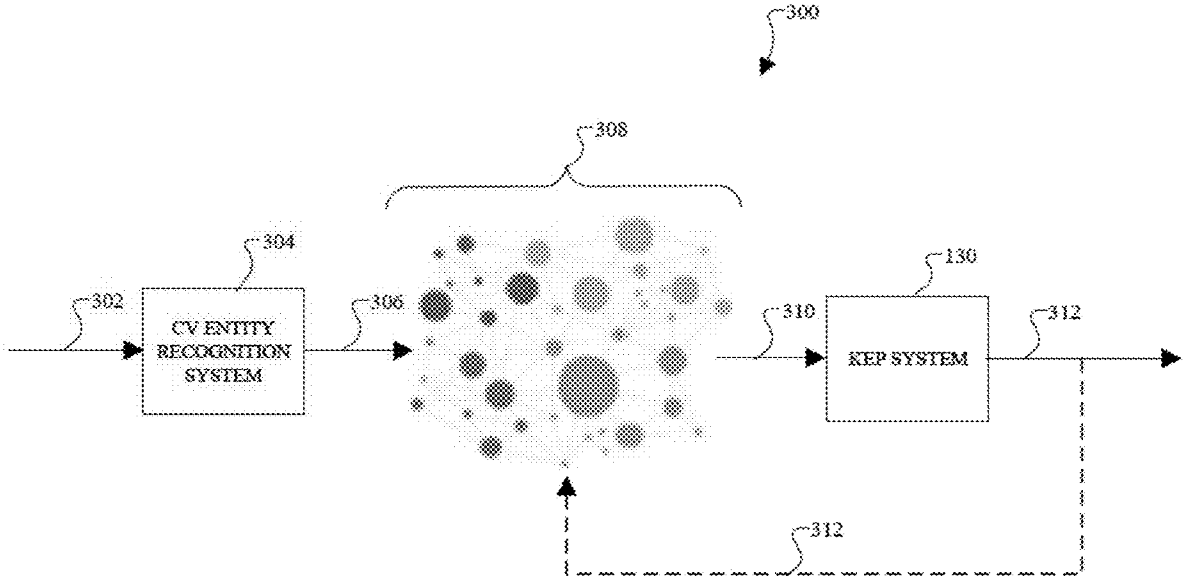
FIG. 3 is a diagram of an example of a knowledge-based entity prediction system as a post processing step for computer vision entity prediction techniques according to an example embodiment of this disclosure.

FIG. 3 is a diagram of an autonomous driving (AD) perception pipeline 300, which includes the employment of the trained machine learning model of the KEP system 130 to perform KEP. The AD perception pipeline 300 is a process that contributes to scene understanding by identifying sensor detections within a given scene and providing semantic entity labels for that scene. In this example, the AD perception pipeline 300 includes at least a computer-vision (CV) entity recognition system 304, a KG generation system 308, and the KEP system 130. In this case, as shown in FIG. 3, the KEP system 130 performs KEP as a post-processing task with respect to the recognition task performed by the CV entity recognition system 304.

The CV entity recognition system 304 employs visual object detection techniques to generate a set of entity labels 306 as output in response to receiving sensor data 302 as input. For example, the CV entity recognition system 304 may receive the sensor data 302 from the sensor system 170. The sensor data 302 may include raw images, video, LIDAR point clouds, other sensor data, or any combination thereof. The sensor data 302 may be two-dimensional (2D) sensor data (e.g., camera images) or three-dimensional (3D) sensor data (e.g., 3D point clouds). The CV entity recognition system 304 may generate 2D/3D bounding-boxes about the detections to enable those detections to be identified. The CV entity recognition system 304 may employ object recognition techniques, semantic segmentation techniques, or a combination thereof. Semantic segmentation takes a more granular approach by assigning a semantic category to each pixel in an image. The CV entity recognition system 304 identifies a set of detections (e.g. one or more detections) in the sensor data 302 and provides a set of entity labels 306 (e.g., one or more entity labels) for that set of detections. In this example, the CV entity recognition system 304 includes at least one machine learning system to perform this recognition task of generating the set of entity labels 306, for example, by classification techniques. The set of entity labels 306 are then used by the KG system 308.

As shown in FIG. 3, KG system 308 obtains the set of entity labels 306 as input. The KG system 308 generates at least one KG 310 with semantics based at least on the set of entity labels 306 according to an ontology. For example, the KG system 308 may generate a node for each entity label from the set of entity labels 306. The KG system 308 may also generate a node for other entity labels (e.g., additional entity labels 312). In an example embodiment, the set of entity labels 306 and/or the additional entity labels 312 represent entity class nodes in the KG 310 based on the ontology. The KG system 308 may further include the generation of relations between related pairs of nodes. For instance, referring to FIG. 2 as a non-limiting example, the KG system 308 generates relations such as the "includes" relation 242, "type" relation 244, "location" relation 246. "subclass" relation 248, "playswith" relation 250, and "livesin" relation 252. The KG system 308 includes obtaining the set of entity labels 306 as input, constructing at least one KG 310 with semantics based on the set of entity labels 306 according to an ontology, and providing the KG 310 as output.

The KEP system 130 is configured to obtain or receive the KG 310 as input. The KEP system 130 is configured to output a set of additional entity labels 312 for a given scene instance. This set of additional entity labels 312 represents entities that are highly likely to be in the scene, but may have been missed or unrecognized during the CV entity recognition system 304. These entities may be missing or unrecognized by the CV entity recognition system 304 for various reasons, such as hardware limitations, occluded entities, poor field-of view, degraded visuals, etc. As shown in FIG. 3, the KG system 308 may then obtain and use these additional entity labels 312 to complete the KG 310. In addition, the KEP system 130 is configured to provide the set of additional entity labels 312 to at least one downstream application or system. In this regard, with respect to the task of scene understanding, the KEP system 130 is advantageous in providing the additional entity labels 312 for a given scene instance that may have been missed or not recognized by the CV entity recognition system 304. The KEP system 130 contributes to providing a more complete view of a given scene than the limited view provided by the CV entity recognition system 304.

Figure 4:
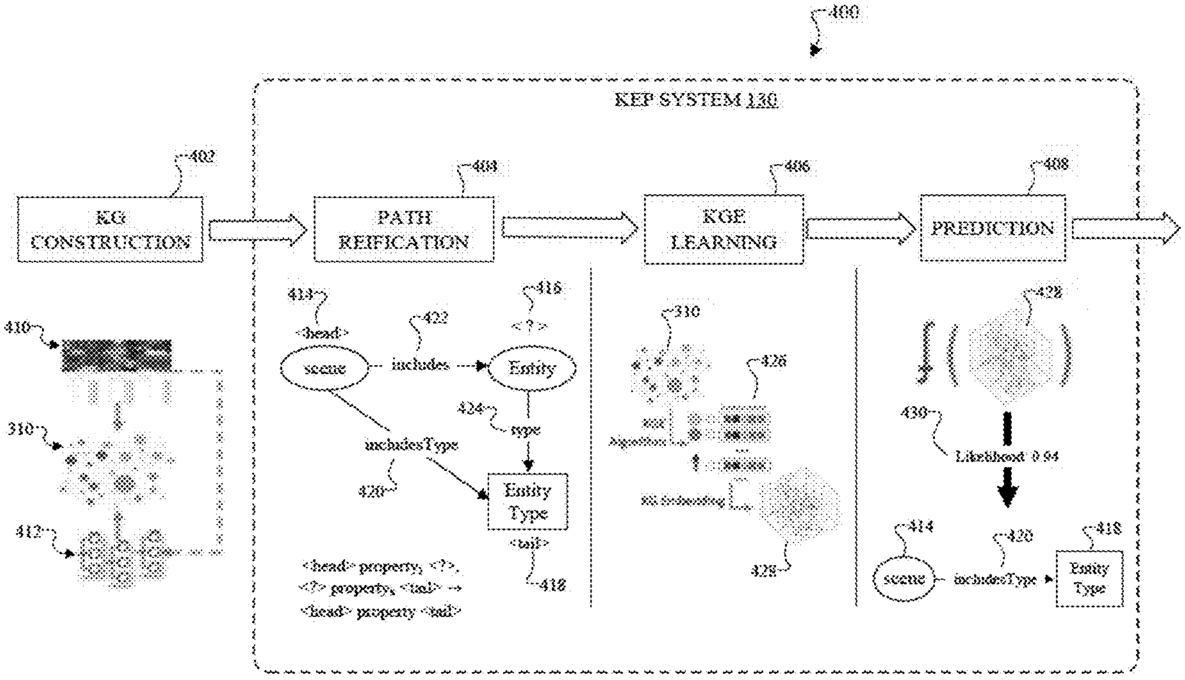
FIG. 4 is a diagram of an example of a process relating to knowledge-based entity prediction according to an example embodiment of this disclosure.

FIG. 4 is a diagram of an example of a process 400 relating to knowledge-infused KEP according to an example embodiment. In this regard, FIG. 4 illustrates the process 400 as a pipeline architecture. In this example, the process 400 includes four phases: (1) a first phase 402 of KG construction. (2) a second phase 404 of path reification, (3) a third phase 406 of knowledge graph embedding (KGE) learning, and (4) a fourth phase 408 of entity prediction. In addition, FIG. 4 also illustrates an example in which the KEP system 130 provides the second phase 404, the third phase 406, and the fourth phase 408 upon receiving at least one KG, which is constructed during the first phase 402. The process 400 may be performed by at least one processor of the processing system 110 (FIG. 1), any suitable data processing system, or any number and combination thereof. Also, the process 400 may include more phases or less phases than the four phases of FIG. 4 provided that the process 400 is able to achieve knowledge-infused KEP, as discussed herein.

At the first phase 402, in an example, the process includes performing KG construction. As shown in FIG. 4, the process includes constructing at least one KG 310 based on one or more datasets 410 and an ontology 412. More specifically, as an example, the process includes obtaining at least one dataset 410, which includes sensor data and at least one set of labels for that sensor data. The dataset 410 may be within at least one suitable domain depending on the application. For instance, in the domain of autonomous driving, the dataset 410 includes raw data generated by the sensor system 170 (e.g., a camera. LIDAR, RADAR, GPS, IMU, any sensor, or any combination thereof) along with corresponding annotations or labels. The dataset 410 may include complex driving scenarios (e.g., steep hills, construction, dense traffic, pedestrians, various times of day, various lighting conditions, etc.). The dataset 410 may include numerous driving sequences of a predetermined duration (e.g. 8 seconds per driving sequence), which include at least camera images and LIDAR sweeps. Each sequence may be sampled into frames with a predetermined frequency (e.g., 10 FPS). In addition, the dataset 410 may include high quality annotations (i.e., at least one set of labels) with, for example, bounding box labels (e.g., cuboid labels), semantic segmentation labels, any suitable labels, or any combination thereof. More specifically, for example, the semantic segmentation labels may include granular label details such as smoke, car exhaust, vegetation, drivable surface, etc.

The process also includes generating or obtaining an ontology 412. For example, in FIG. 4, the process includes generating or obtaining a driving scene ontology (DSO). The DSO provides a formal structure along with semantics for representing information about scenes. The DSO is configured to describe any driving scene regardless of its source (e.g., dataset 410). That is, the DSO is configured to be data agnostic. In this example, a scene is defined as an observable volume of space and time. More colloquially, a scene refers to a situation in which objects may appear (e.g. vehicle) and events may occur (e.g. lane change maneuver).

Figure 5A:
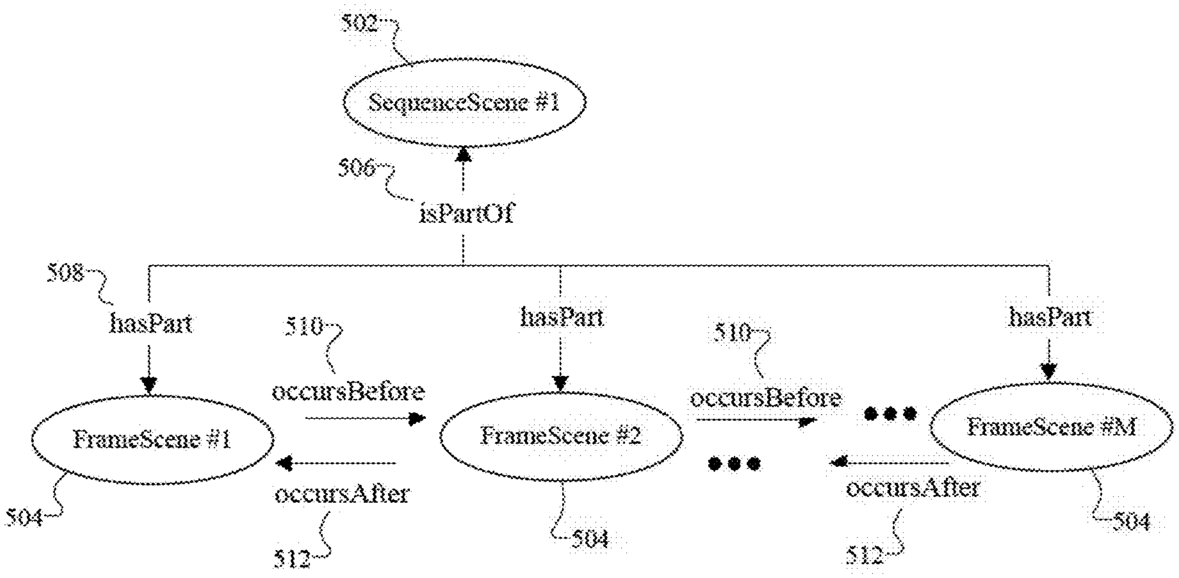
FIG. 5A is a diagram of an example of a sequence scene in relation to a frame scene according to an example embodiment of this disclosure.

FIG. 5A illustrates different types of scenes of the DSO according to an example embodiment. For example, the DSO includes at least a sequence scene ("SequenceScene" 502) and a frame scene ("FrameScene" 504). FIG. 5A also shows the "SequenceScene" 502 relative to the "FrameScene" 504, as well as their relations to each other. The "SequenceScene" 502 and the "FrameScene" 504 are represented as a type of scene instance and are thus denoted as round nodes. In this example, the "SequenceScene" 502 represents a situation in which an ego-vehicle drives over an interval of time and along a path of spatial locations. In this regard, for instance, the "SequenceScene" 502 represents a type of scene, which is captured, for instance, by an ego-vehicle as video. Also, in this example, "FrameScene" 504 represents a type of scene, which is captured, for instance, by an ego-vehicle at a specific instant of time and point in space. The "FrameScene" 504 is captured, for instance, as an image. The "FrameScene" 504 is generated by sampling the frames of a video. The "FrameScene" 504 may be a part of the "SequenceScene" 502 if the time instant and spatial point of that "FrameScene" 504 are within the time interval and spatial path of the "SequenceScene" 502, as shown in FIG. 5A. In this regard, the "FrameScene" 504 and the "SequenceScene" 502 are connected via the "isPartOf" relation 506 to indicate that the frame scene is a part of the sequence scene. In addition, the "SequenceScene" 502 and the "FrameScene" 504 are connected via the "hasPart" relation 508 to indicate that the sequence scene includes at least one frame scene. In this regard, as shown in FIG. 5A, the SequenceScene 502 may contain any number ("M") of "FrameScenes" 504 in a sequence, where "M" represents an integer number greater than 1. A "FrameScene" 504 may occur before another "FrameScene" 504, as indicated via the "occursBefore" relation 510. For example, the second "FrameScene" 504 occurs before the $M^{th}$ "FrameScene" 504. Also, a "FrameScene" 504 may occur after another "FrameScene" 504, as indicated via the "occursAfter" relation 512. For example, the second "FrameScene" 504 occurs after the first "FrameScene" 504.

Figure 5B:
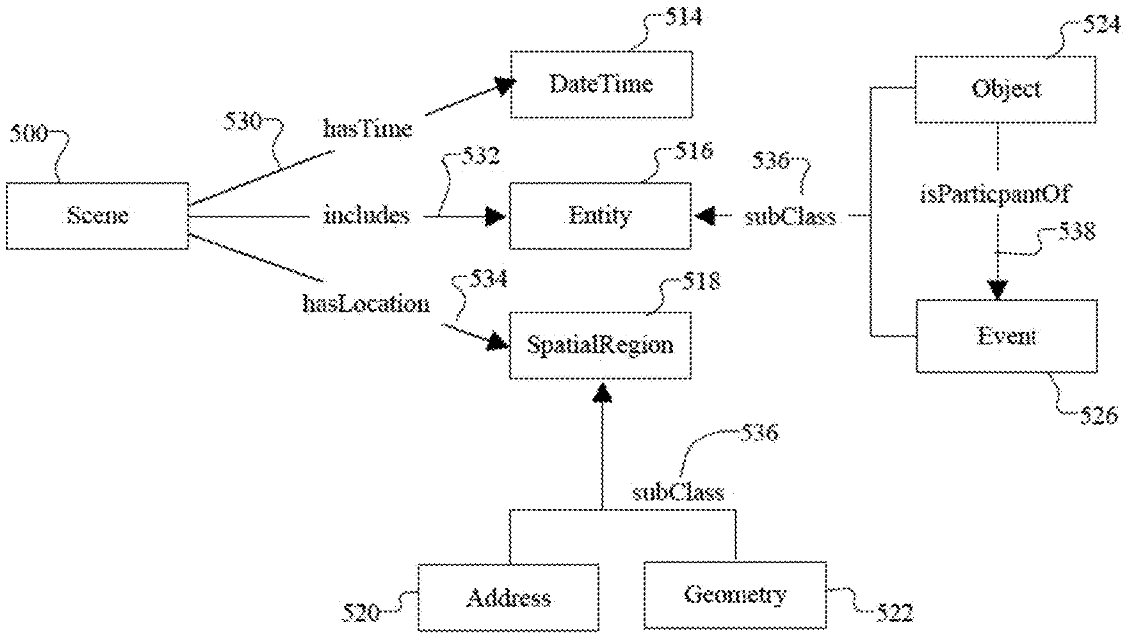
FIG. 5B is a diagram of an example of a basic structure of a scene according to an example embodiment of this disclosure.

As shown in FIG. 5A and FIG. 5B, the DSO may represent time in several ways. As one example, each "FrameScene" 504 is annotated with a time instant, which is encoded as "DateTime" 514 via the "hasTime" relation 530. Each "SequenceScene" 502 is annotated with two time instants, which represent the beginning and end of a time interval. As another example, scenes may be linked to other scenes based on their relative temporal order, using the "occursBefore" relation 510 and/or the "occursAfter" relation 512. In addition, as indicated in FIG. 5B, spatial information ("SpatialRegion" 518) is linked to the "FrameScene" 504 through the "hasLocation" relation 534. The range of "hasLocation" 534 is the "SpatialRegion" 518, which may be expressed as a "subClass" relation 536 via "Geometry" 522 with latitude and longitude coordinates or via "Address" 520 with address data (e.g., country, province, city, street, etc.).

FIG. 5B illustrates an example of the basic structure of a scene 500, as defined by the DSO, according to an example embodiment. As discussed above, the scene 500 may include a sequence scene as a scene instance or a frame scene as a scene instance. FIG. 5B includes rectangular nodes to denote that these elements occur at the entity class level. More specifically, as shown in FIG. 5B, the "Scene" class 500 includes an "Entity" class 516. In this case, the "Entity" class 516 is a perceived object or event. For instance, as a non-limiting example, the "Entity" class 516 may include moving vehicles, parked cars, pedestrians, ambulances, pedestrians with wheelchairs, etc. The "Entity" class 516 is linked to the scene 500 through the "includes" relation 532. The "Entity" class 516 is divided into two classes (or entity types), "Object" class 524 and "Event" class 526, via a "subClass" relation 536. The "Object" class 524 is a subclass of the "Entity" class 516. The "Event" class 526 is a subclass of the "Entity" class 516. The "Object" class 524 may participate in the "Event" class 526, as represented by "isParticipantOf" (and/or "hasParticipant") relation 538. In an example embodiment, the "Object" class 524 and the "Event" class 526 are derived from the dataset 410 (e.g., the bounding box labels and the segmentation labels). Table 1 lists the primary relations associated with the "Scene" class 500 as defined by the DSO.

TABLE 1

| RELATION | DOMAIN | RANGE |
|---|---|---|
| beginTime | SequenceScene | DateTime |
| endTime | SequenceScene | DateTime |
| hasLocation | Scene | SpatialRegion |
| hasPart | SequenceScene | FrameScene |
| hasParticipant | Event | Object |
| hasTime | FrameScene | DateTime |
| includes | Scene | Entity |
| isParticipantOf | Object | Event |
| isPartOf | FrameScene | SequenceScene |
| occursAfter | Scene | Scene |
| occursBefore | Scene | Scene |

Referring back to the process 400 (FIG. 4), at the first phase 402, the system 100 is configured to integrate information from external sources when constructing the KG 310. For example, the system 100 may integrate additional knowledge about a scene into the KG 310. As a non-limiting example, the system 100 may integrate location attributes (e.g., latitude and longitude coordinates for each frame, Open Street Map (OSM) data, address information, OSM tags, etc.) that enrich the spatial semantics of the scene. The integration of additional knowledge into the KG 310 may result in additional entities being connected to the scene instance, as deemed necessary or appropriate to enhance the KG 310 and/or the performance of the KEP system 130.

Afterwards, the KG 310 is constructed by converting the scene data contained in the dataset 410 (along with the additional information from external sources if available) to a format (e.g., RDF[2] format), which is conformant with the ontology 412 (e.g. DSO). The relevant scene is queried and extracted from the dataset 410, making this process trivially straightforward. As an example, the RDF can then be generated using an RDF library (e.g., RDFLib[4] Python library version: 4.2.2 or any suitable library). For instance, in FIGS. 3 and 4, the KG 310 is constructed as a driving scene knowledge graph (DSKG).

The DSKG contains data structures that include triples, where each triple is of the form of <h, r, t>, where h=head, r=relation, and t=tail and where h and t represent nodes and r represents an edge. For example, the DSKG includes triples of the form of <$scene_i$, includes, $car_j$> to indicate that an entity instance ($car_j$) is included in a scene instance (scenes). In a number of the examples disclosed herein, the entity instances are expressed with all lowercase letters (e.g. $car_j$) while their corresponding entity classes are expressed in title case (e.g. Car). An entity instance is linked to its class in DSO through triples of the form of <car, type, Car>. In this context, it may be tempting to formulate KEP as a linked path (LP) problem with the objective to complete triples of the form of <$scene_i$, includes,?>, where '?' represents the element to be predicted. This formulation, however, would entail predicting a specific entity instance rather than predicting the class of an entity. Similar to CV-based object recognition, the objective of KEP should be to predict the class of an entity in the scene—e.g. predicting Car rather than car. In other words, most LP models are unable to complete the triple of the form of <h, r, t> when there is no r that directly links h and t in the training data, even if h and t are linked through a path of n-hops (n>1) in the KG, such as <h, $r_1$, $t_1$>, <$t_1$, r2, t>. This is the issue faced by the KEP system 130 with the DSKG, as a scene instance is connected to an entity sub-class only via a 2-hop path. Due to this requirement, the KEP system 130 cannot simply rely on LP in a straightforward manner. Therefore, upon generating the KG 310 (e.g., DSKG), the process 400 proceeds to the second phase 404 to overcome this technical problem.

At the second phase 404, in an example, the process 400 includes performing path reification. With path reification, for a given scene instance (e.g., "scene" node 414), the system 100 is configured to provide a technical solution for KEP by determining the entity class (e.g., "Entity Type" node 418) of an entity instance (e.g., "Entity" node 416). However, since the entity class (e.g., "Entity Type" node 418) is not immediately available through a direct link from the scene instance (e.g., "scene" node 414), the system 100 is configured to formulate this KEP task as a path prediction problem (i.e. predicting the path from a scene instance to the entity class). The path may be of any length (e.g., m-hop where m represents an integer greater than 1). To solve this path prediction problem, the system 100 introduces or creates a new relation (e.g., "includesType" relation 420) to the base KG 310 (e.g., DSKG). The system 100 uses this new relation to reify a multi-hop path (e.g., 2-hop path). More specifically, in this example, the system 100 generates a new relation (e.g., "includesType" relation 420), which directly links a source node (e.g., "scene" node 414) with a target node (e.g., "Entity Type" node 418) with a single-hop. In this regard, the "includesType" relation 420 is a combination of the "includes" relation 422 and the "type" relation 424. This requirement can be more formally defined as follows:

Let $s_i$ be the $i^{th}$ scene instance node in DSKG ($s_i \in S$) where S represents the set of all scene instance nodes in DSKG, $e_j$ be the $j^{th}$ entity instance node ($e_j \in I$), and '?' be a subclass of Entity in the DSO such that (?∈E where E={Car, Animal, Pedestrian, . . . }⊆C). In this case, the system 100 is configured to perform path reification as follows:

$$\langle s_i,\text{includes},e_j\rangle \wedge \langle e_j,\text{type},?\rangle \Rightarrow \langle s_i,\text{includesType},?\rangle \quad [1]$$

With path reification, the DSKG is transformed into a $DSKG_R$ structure (i.e. DSKG with reified paths). Since the "includesType" relation is now present during training, the system 100 is configured to use or re-use link prediction (LP) methods to address the KG 310 incompleteness issue. More specifically, LP is a technique for predicting a missing link, such as predicting the head <?, r, t> or predicting the tail <h, r, ?> of a triple for a single hop (or a single relation). As a result of the creation of this reified relation ("includesType" relation 420) to provide a single hop, ⟨ the KEP can now be mapped to LP in order to complete triples of the form ⟨ $s_i$, includesType, ?⟨ in $DSKG_R$. Before path reification, the KEP could not effectively be mapped to LP in order to predict the entity subclasses or the entity types of the DSKG due to the multiple hops (or multiple relations) that existed between the source node ("scene" instance) and the target node ("Entity Type" class).

Figure 6A:
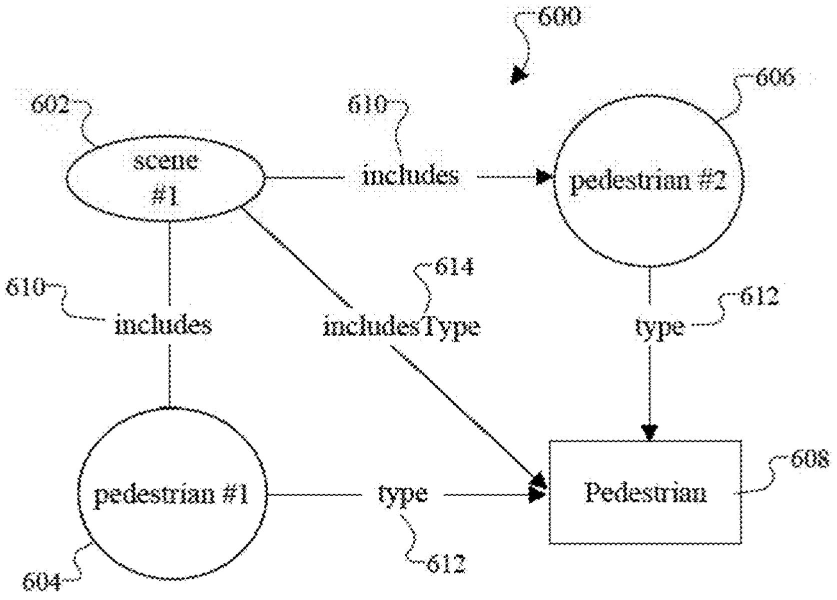
FIG. 6A is a diagram of a non-limiting example of a first knowledge graph structure according to an example embodiment of this disclosure.
Figure 6B:
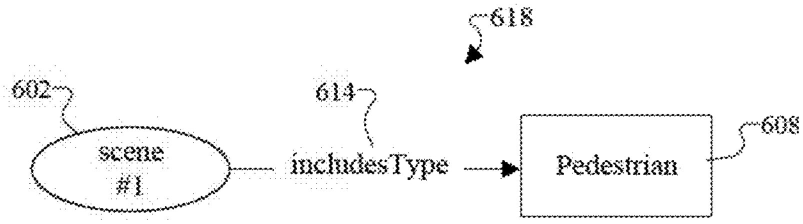
FIG. 6B is a diagram of a non-limiting example of a second knowledge graph structure according to an example embodiment of this disclosure.
Figure 6C:
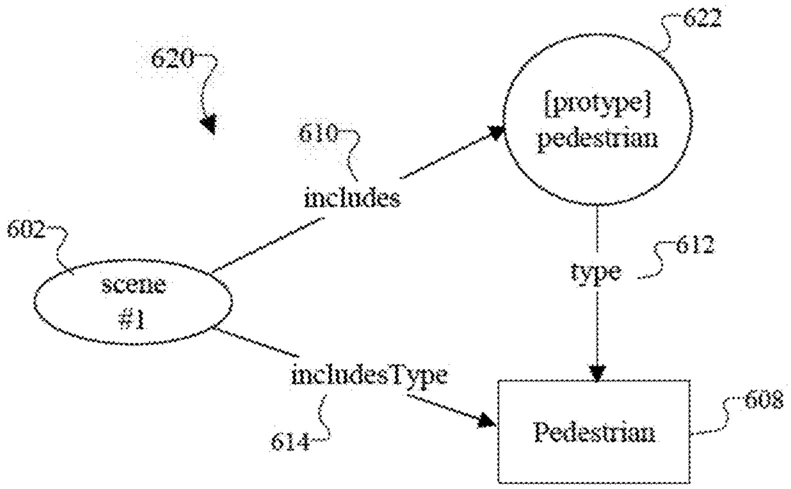
FIG. 6C is a diagram of a non-limiting example of a third knowledge graph structure according to an example embodiment of this disclosure.

Although $DSKG_R$ is described above as a KG structure with reified paths, the system 100 is not limited to this particular pattern for the reified KG structure. In this regard, the system 100 is configured to generate a reified KG structure with reified paths based on the KG 310 in a variety of patterns. The patterns may differ with respect to how entity instance information is represented along the path from a scene instance to an entity class. FIGS. 6A, 6B, and 6C provide examples of three different reified KG structures, which may be generated by the system 100.

FIG. 6A is a diagram of a non-limiting example of a portion of a first knowledge graph structure 600 according to an example embodiment. The first knowledge graph structure 600 is $DSKG_R$, which is considered to represent a "complete graph" structure and the most expressive representation with respect to DSKG when compared to the second and third knowledge graph structures, respectively. $DSKG_R$ includes all of the nodes and all of the edges of the DSKG that are associated the reified paths. For example, as shown in FIG. 6A. $DSKG_R$ includes entity instances 604 and 606 ("pedestrian #1" node and "pedestrian #2" node) together with the corresponding relations 610 and 612 (e.g., "includes" relation and "type" relation) of the entity instances 604 and 606. $DSKG_R$ also includes the entity types 608 ("Pedestrian" class node) together with corresponding reified relations 614 (e.g. "includesType" relation). As shown in FIG. 6A the first knowledge graph structure 600 includes the information from the base DSKG while benefitting from the inclusion of each reified relation 614 ("includesType" relation) such that each entity type 608 is directly linked to the scene instance 602 ("scene #1" node) via a single hop. Each reified relation 614 is advantageous in enabling the KEP system 130 to predict an entity type 608 (or entity class) of an unrecognized or missing entity instance for a particular scene instance.

FIG. 6B is a diagram of a non-limiting example of a portion of a second knowledge graph structure 618 according to an example embodiment. The second knowledge graph structure 618 is $DSKG_{Bi}$, which represents a "bippartite graph." The second knowledge graph structure 618 is a more compact representation than the first knowledge graph structure 600. Also, the second knowledge graph structure 618 is a more compact representation than the third knowledge graph structure 620. More specifically, the second knowledge graph structure 618 contains each scene instance 602 (e.g., "scene #1" node), each reified relation 614 (e.g., "inchidesType" relation), and each entity type 608 (e.g., "Pedestrian" class node). This pattern results in a bipartite-graph structure with reified relations 614 directly linking scene instances 602 (or source nodes) to entity types 608 (or target nodes) via single hops, respectively. Each reified relation 614 is advantageous in enabling the KEP system 130 to predict an entity type or entity class of an unrecognized or missing entity instance for a particular scene instance.

As shown in FIG. 6B, the second knowledge graph structure 618 discards or does not include the entity instances 604 and 606 (e.g., pedestrian #1 and pedestrian #2) of the DSKG. The second knowledge graph structure 618 also discards or does not include the relations 610 and 612 (e.g. "includes" relation and "type" relation) from the base DSKG that are linked to the entity instances 604 and 606. That is, unlike the first knowledge graph structure 600, the second knowledge graph structure 618 does not contain each multi-hop path (e.g., "includes" relation and the "type" relation) from the scene instance 602 to the respective entity type 608. In this regard, the resulting entity instance cardinality for each scene instance is reduced to zero in the second knowledge graph structure 618 compared to the DSKG. Meanwhile, the second knowledge graph structure 618 maintains the same entity class cardinality as the DSKG.

FIG. 6C is a diagram of a non-limiting example of a portion of a third knowledge graph structure 620 according to an example embodiment. The third knowledge graph structure 620 is $DSKG_{Prot}$, which represents a "prototype graph." The third knowledge graph structure 620 includes a single prototype instance 622 (e.g., "[prototype] pedestrian" node) to represent all entity instances 604 and 606 of a particular entity type 608. In this regard, $DSKG_{Prot}$ replaces all entity instances 604 and 606 (e.g. "pedestrian #1" node and "pedestrian #2 node) with a single prototype instance 622 (e.g., "[prototype] pedestrian" node) for each linked entity type 608 (e.g. "Pedestrian" node). The prototype instance 622 represents all of the entity instances 604 and 606 linked to a particular entity type 608 for the scene instance 602. In addition, $DSKG_{Prot}$ includes prototype relations (e.g., "includes" relation 610 and "type" relation 612) to connect the prototype instance 622 in a valid manner to the other related nodes (e.g., scene instance 602 and entity type 608). In $DSKG_{Prot}$, the resulting entity instance cardinality for a scene instance 602 is equal to the entity class cardinality.

Referring back to FIG. 4, at the second phase 404, the system 100 is configured to generate the reified paths and construct a reified KG structure that includes at least these reified paths. More specifically, the system 100 is configured to transform the KG 310 into a reified KG structure by creating reified relations to transform the multi-hop paths into single-hop paths. The reified KG structure may include the first KG structure (FIG. 6A), the second KG structure (FIG. 6B), the third KG structure (FIG. 6C), any suitable KG structure with reified paths, or any number and combination thereof provided that the reified KG structure includes at least the reified relations in relation to the scene instance and the entity class (or entity type). After the second phase 404 is complete, the process advances to the third phase 406.

At the third phase 406, in an example, the process includes performing KGE learning. In this third phase, the system 100 is configured to translate the reified KG structure into at least one KGE 428, which encodes the reified KG structure in a low-dimensional, latent feature vector representation 426. More specifically, the system 100 uses at least one machine learning algorithm (e.g., KGE algorithm) to learn a representation of the reified KG structure with reified paths, which was constructed at the second phase 404. In this regard, the KGE learning is performed with an LP objective to generate a latent space, which may be useful for various downstream applications and various other tasks such as querying, entity typing, semantic clustering, etc.

In an example embodiment, the system 100 is configured to learn one or more KGEs 428 using one or more KGE algorithms and re-using the learned latent space for KEP. In this regard, the process may include selecting one or more KGE algorithms. A non-limiting example of a KGE algorithm includes TransE, HolE, ConvKB, or any number and combination thereof. As a first example, TransE is a representative KGE model, which learns relations between nodes as a geometric translation in the embedding space. This, however, limits its ability to handle symmetric/transitive relations, 1:N relations and N:1 relations. As a second example, HolE uses the circular correlation among head and tail of a triple with its relation embedding to learn an efficient compression of a full expressive bi-linear model. This allows both nodes and relations to be represented in $\mathbb{R}^d$. As a third example, ConvKB learns a high-level feature map of the input triple by passing a concatenated node/relation embeddings through a convolution layer with set of filters (#filters $\tau=|\Omega|$). The fact score is then computed by using a dense layer with only one neuron and weights W. After the system 100 learns the latent space or embedding space from the reified KG structure using at least one KGE algorithm, the system 100 is configured to use the one or more KGEs 428 for KEP, as discussed below.

At the fourth phase 408, in an example, the process includes performing KEP. More specifically, the system 100 is configured to perform KEP with at least one learned KGE 428, as indicated by Algorithm 1. In addition, Table 2 provides a list of notations, which are used in Algorithm 1, as shown below.

Algorithm 1

Input: Learned KGE: $H_G \in \mathbb{R}^{n\times d}$
Output: Set of predicted entity classes: $E^* \subseteq E$ 1 $\mathcal{G}'_{test} + S \times r \times E$ where $S \subseteq \mathcal{I}$, $E \subseteq C$ and $r = includesType$
2 $E^* = \{\ \}$
3 foreach scene $s_i$ in S do
4 | $\mathcal{T}_S^{(i)} = \{\langle h, r, t\rangle | h = s_i, t \in E\} \subseteq \mathcal{G}'_{test}$
5 | *foreach* triple $t_j$:$\langle h, r, t'\rangle$ in $\mathcal{T}_S^{(i)}$ do
6 | | $X_{neg} = \{(h, r, t') | t' \in\}$
7 | | $\hat{X}_{neg} = \text{lookup}(H_G, X_{neg}) \in \mathbb{R}^{m\times d\times 3}$, $m = |E|$
8 | | scores: $Q = \left\{q_1, \ldots, q_i, \ldots, q_m \mid q_i = \phi(\hat{X}_{neg}^{(i)}), q_i \in \mathbb{R}\right\}$
9 | | top-$k$ labels $\mathcal{L}_K^{(i)} = \{l_x \mid l_x \in \text{argsort}(Q), x \le k \le m, m = |E|\}$
10 | | $E^* = E^* \cup \mathcal{L}_K^{(i)}$ -continued Algorithm 1

11 | end
12 | return $E^*$
13 end

TABLE 2

| | |
|---|---|
| $\mathcal{G}$ | Knowledge Graph |
| $\mathcal{R}$ | Set of all relations in $\mathcal{G}$ |
| $\mathcal{N}$ | Set of all nodes in $\mathcal{G}$ |
| $\mathcal{C}$ | Set of all class nodes in $\mathcal{G}$ |
| $\mathcal{I}$ | Set of all instance nodes in $\mathcal{G}$ |
| $\mathcal{T}$ | Set of triples; $\langle h, r, t\rangle \in \mathcal{T}$ |
| $\mathcal{S}$ | Set of all Scene instance nodes |
| $\varepsilon$ | Set of all Entity class nodes |

Algorithm 1 is performed by the system 100, particularly the KEP system 130, via at least one processor of the processing system 110 or by any suitable processing device. As an overview, the system 100 is configured to receive the KGE 428 as input and provide a set a predicted entity classes ($E^*$) for each scene instance ($s_i$) as output. More specifically, the system 100 is configured to perform a method for each scene instance ($s_i$) within the set of all scene instances. For each scene instance, the system 100 is configured to obtain a set of test triples ($\mathcal{T}_S$) such that each test triple includes a particular scene instance ($s_i$) and an entity class that relates to that particular scene instance ($s_i$) within the set of all entity classes (E). For each triple in the set of test triples ($\mathcal{T}_S$), the system 100 generates a set of negative triples ($x_{neg}$), which serve to determine how likely a candidate (t') is linked to the given scene instance ($s_i$) via the given relation (r="includesType" relation). In this case, each negative triple includes the scene instance ($s_i$), the "includesType" relation, and a candidate (t'). Each candidate (t') represents an entity class within the set of all entity classes (E) that the given scene instance ($s_i$) may possibly include. After the set of negative triples is generated for the given scene instance, the system 100 is configured to retrieve embeddings via a lookup function from the learned KGE 428 based on each negative triple, as indicated in line 7 of Algorithm 1. The system 100 is configured to generate a score (e.g., a likelihood score 430) for each negative triple of the scene instance ($s_i$) based on the retrieved KG embeddings, as indicated in line 8 of Algorithm 1. The system 100 is configured to sort the negative triples based on the scores via the argsort function and obtain a set of the top-k labels, where 'k' represents a predetermined threshold (e.g., a preselected number of labels). The top-k labels represent the k-highest ranked labels (e.g., candidates or entity classes) for the given scene instance. The system 100 is configured to aggregate the set of top-k labels for the set of test triples ($\mathcal{T}_S$) to obtain a set of predicted entity classes ($E^*$) for the given scene instance ($s_i$). The system 100 is configured to provide the set of predicted entity classes ($E^*$) as output. The system 100 is thus configured to obtain a set of predicted entity classes, which are highly likely linked to the scene instance ($s_i$). The system 100 determines that the set of predicted entity classes (E') include one or more missing or unrecognized entity classes of the scene instance ($s_i$).

As indicated in Algorithm 1, the objective of KEP is to predict a specific link captured by triples, where each triple is denoted as $\langle h, r, t\rangle$ with 'h' representing a head (or a node), 'r' representing a relation (or edge), and 't' representing a tail (or a node). To enable this more specific link prediction based on the reified KG structure, the system 100 is configured to learn the KGE representation of the nodes (i.e., heads and tails) and the edges (i.e., relations) using the LP objective. Then, for each scene instance $s_i$, the KGE 428 is queried using "includesType" relation to find the missing k-entity class labels $\mathcal{L}_k \subseteq E$ (as indicated in lines 5-10 of Algorithm 1). Algorithm 1 succinctly describes this KEP process via at least one KGE 428, which is trained using at least one KGE algorithm. The computational complexity of Algorithm 1 is $\mathcal{O}(\mathcal{N} \times \mathcal{M})$ where $\mathcal{N} = |S|$ and $\mathcal{M} = |E|$.

Furthermore, there are a number of differences between KEP, as presented above via Algorithm 1, and the traditional LP setup. For example, in contrast to Algorithm 1, the KGE algorithms for LP learn to maximize the estimated plausibility $\phi(h, r, t)$ for any valid triple while minimizing it for any invalid, or negative, triple. Such KGE models can then be used to infer any missing link by obtaining the element (head or tail) with the highest plausibility to complete the triple $\langle h, r, t \rangle$. However, as expressed in Algorithm 1, the processing system 110 is configured to perform KEP in a different manner than the traditional LP setup.

As discussed herein, the embodiments include a number of advantageous features, as well as benefits. For example, the embodiments are configured to perform KEP, which improves scene understanding by predicting potentially unrecognized entities and by leveraging heterogeneous, high-level semantic knowledge of driving scenes. The embodiments provide an innovative neuro-symbolic solution for KEP based on knowledge-infused learning, which (i) introduces a dataset agnostic ontology to describe driving scenes, (ii) uses an expressive, holistic representation of scenes with KGs, and (iii) proposes an effective, non-standard mapping of the KEP problem to the problem of LP using KGE. The embodiments further demonstrate that knowledge-infused learning is a potent tool, which may be effectively utilized to enhance scene understanding for at least partially autonomous driving systems or other application systems.

Overall, the embodiments introduce the KEP task and propose an innovative knowledge-infused learning approach. The embodiments also provide a dataset agnostic ontology to describe driving scenes. The embodiments map the KEP to the problem of KG link prediction by a technical solution that overcomes various limitations through a process that includes at least path reification.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for providing knowledge-based entity prediction, the computer-implemented method comprising:

obtaining a knowledge graph based on (i) labels associated with a scene and (ii) an ontology, the knowledge graph including nodes and edges in which a set of the nodes represent the labels associated with the scene and each edge represents a relation between related pairs of nodes;

identifying a path with multiple edges having multiple relations from a source node to a target node via at least one intermediary node between the source node and the target node, the source node being a scene instance of the scene, the intermediary node being an entity instance, and the target node being a class of the entity instance, the class identifying a category of the entity instance;

reifying the path by generating a reified relation that combines the multiple relations of the path such that the reified relation is represented as a new edge that includes each of the multiple relations and that directly connects the source node to the target node;

generating a reified knowledge graph structure based on the knowledge graph, the reified knowledge graph structure including at least the source node, the target node, and the new edge; and training a machine learning system to learn a latent space defined by the reified knowledge graph structure to predict an unrecognized entity in the scene.

2. The computer-implemented method of claim 1, further comprising:

querying the trained machine learning system to provide the class of the unrecognized entity in the scene in response to receiving the scene instance and the reified relation as input.

3. The computer-implemented method of claim 1, wherein the machine learning system includes at least one knowledge graph embedding model.

4. The computer-implemented method of claim 1, wherein:

the labels identify detections based on sensor data taken of the scene;

the detections include detected objects, detected events, or a combination of the detected objects and the detected events; and the labels are generated via another machine learning system in response to receiving the sensor data as input.

5. The computer-implemented method of claim 1, wherein:

the reified knowledge graph structure includes the intermediary node within the path; and the reified knowledge graph structure includes the multiple edges of the path.

6. The computer-implemented method of claim 1, wherein the ontology is data agnostic.

7. The computer-implemented method of claim 1, wherein:

the labels identify detections from sensor data of the scene.

8. A data processing system comprising:

one or more non-transitory computer readable storage media storing computer readable data including instructions that are executable to perform a method; and one or more processors in data communication with the one or more non-transitory computer readable storage media, the one or more processors being configured to execute the computer readable data and perform the method that comprises:

obtaining a knowledge graph based on (i) labels associated with a scene and (ii) an ontology, the knowledge graph including nodes and edges in which a set of the nodes represent the labels associated with the scene and each edge represents a relation between related pairs of nodes;

identifying a path with multiple edges having multiple relations from a source node to a target node via at least one intermediary node between the source node and the target node, the source node being a scene instance of the scene, the intermediary node being an entity instance, and the target node being a class of the entity instance, the class identifying a category of the entity instance;

reifying the path by generating a reified relation that combines the multiple relations of the path, the reified relation being represented as a new edge that includes each of the multiple relations and that directly connects the source node to the target node;

generating a reified knowledge graph structure based on the knowledge graph, the reified knowledge graph structure including at least the source node, the target node, and the new edge; and training a machine learning system to learn a latent space defined by the reified knowledge graph structure to predict an unrecognized entity in the scene.

9. The data processing system of claim 8, wherein the one or more processors are configured to execute the computer readable data and perform the method that further comprises:

querying the trained machine learning system to provide the class of the unrecognized entity in the scene in response to receiving the scene instance and the reified relation as input.

10. The data processing system of claim 8, wherein the machine learning system includes at least one knowledge graph embedding model.

11. The data processing system of claim 8, wherein:

the labels identify detections based on sensor data of the scene;

the detections include detected objects, detected events, or a combination of the detected objects and the detected events; and the labels are generated via another machine learning system in response to receiving the sensor data as input.

12. The data processing system of claim 8, wherein:

the reified knowledge graph structure includes the intermediary node within the path; and the reified knowledge graph structure includes the multiple edges of the path.

13. The data processing system of claim 8, wherein:

the labels identify detections from sensor data of the scene.

14. A computer-implemented method comprising:

obtaining a knowledge graph with data structures that include at least a first triple and a second triple, the first triple including a first scene instance, a first relation, and a first entity instance such that the first relation relates the first scene instance to the first entity instance, the second triple including the first entity instance, a second relation, and a first class such that the second relation relates the first entity instance to the first class;

identifying a path based on the first triple and the second triple, the path being defined from the first scene instance to the first class with the first entity instance being between the first scene instance and the first class, the path including at least the first relation and the second relation;

reifying the path by generating a reified relation that combines the first relation and the second relation such that the reified relation is a new edge that includes each of the first relation and the second relation and directly relates the first scene instance to the first class;

constructing a reified knowledge graph structure with a reified triple, the reified triple including the first scene instance, the reified relation, and the first class; and training a machine learning system to learn a latent space of the reified knowledge graph structure to predict an unrecognized entity in the scene.

15. The computer-implemented method of claim 14, further comprising:

querying the trained machine learning system to provide an answer in response to a query, wherein, the query includes the first scene instance and the reified relation, and the answer includes at least a second class of the unrecognized entity of the first scene instance.

16. The computer-implemented method of claim 14, wherein the machine learning system includes at least one knowledge graph embedding model.

17. The computer-implemented method of claim 16, further comprising:

generating a negative triple such that the negative triple includes the first scene instance, the reified relation, and another class, the another class being a candidate selected from a set of entity classes;

generating a score for the negative triple by using the knowledge graph embedding model to determine an estimated plausibility of the candidate with respect to the first scene instance and the reified relation;

determining that the score for the negative triple satisfies a threshold; and returning a set of candidate classes for the first scene instance, the set of the candidate classes including the another class of the negative triple.

18. The computer-implemented method of claim 14, wherein the reified knowledge graph structure includes the first triple and the second triple.

19. The computer-implemented method of claim 14, wherein:

the first class identifies a category of the first entity instance.

* * * * *